United States Patent
Shelby et al.

[11] Patent Number: 6,129,873
[45] Date of Patent: Oct. 10, 2000

[54] PROCESS FOR REMOVING MOISTURE AND VOLATILES FROM PELLETS IN SINGLE SCREW EXTRUDERS

[75] Inventors: Marcus David Shelby, Kingsport; Michael Eugene Donelson, Gray; Douglas Stephens McWilliams, Kingsport, all of Tenn.

[73] Assignee: Eastman Chemical Company, Kingsport, Tenn.

[21] Appl. No.: 09/287,253

[22] Filed: Apr. 7, 1999

Related U.S. Application Data
[60] Provisional application No. 60/081,163, Apr. 8, 1998.

[51] Int. Cl.[7] .................................... B29C 47/74
[52] U.S. Cl. .............. 264/102; 264/211.21; 425/203; 425/208; 366/75
[58] Field of Search ................... 264/102, 101, 264/211.21, 349; 425/203, 207, 208; 366/75, 76.1

[56] References Cited

U.S. PATENT DOCUMENTS

| | | |
|---|---|---|
| 3,985,348 | 10/1976 | Skidmore . |
| 4,051,212 | 9/1977 | Grigat et al. ............... 264/102 |
| 4,063,718 | 12/1977 | Koch ........................ 366/75 |
| 4,103,354 | 7/1978 | Gorbatov et al. ............ 368/88 |
| 4,130,901 | 12/1978 | Borovikova et al. . |
| 4,134,714 | 1/1979 | Driskill . |
| 4,408,887 | 10/1983 | Yamaoka . |
| 4,900,494 | 2/1990 | Wobbe . |
| 4,902,455 | 2/1990 | Wobbe . |
| 5,648,032 | 7/1997 | Nelson et al. .............. 264/101 |

OTHER PUBLICATIONS

*Polymer Devolatilization*, Ed. by Raman J. Albalak, Marcel Dekker, Inc., New York, NY, 1996, pp. 334–336.
C. Rauwendaal, *Polymer Extrusion*, Hanser, Cincinnati, 1994, pp. 395–402.

*Primary Examiner*—Jill L. Heitbrink
*Assistant Examiner*—Mark Eashoo
*Attorney, Agent, or Firm*—Cheryl J. Tubach; Harry J. Gwinnell

[57] ABSTRACT

In a process for extruding a thermoplastic resin in a single screw extruder, a barrel of a single screw extruder has a channel, a feed section and a first melt seal located after the feed section. The process is improved by supplying solid polymer into the feed section and venting moisture extracted from the polymer during the conversion of the polymer from a solid to a melt into a vent area and through a rear vent positioned in the feed section. An unfilled area within the channel of the barrel between the rear vent and the first melt seal forms the vent area.

13 Claims, 1 Drawing Sheet

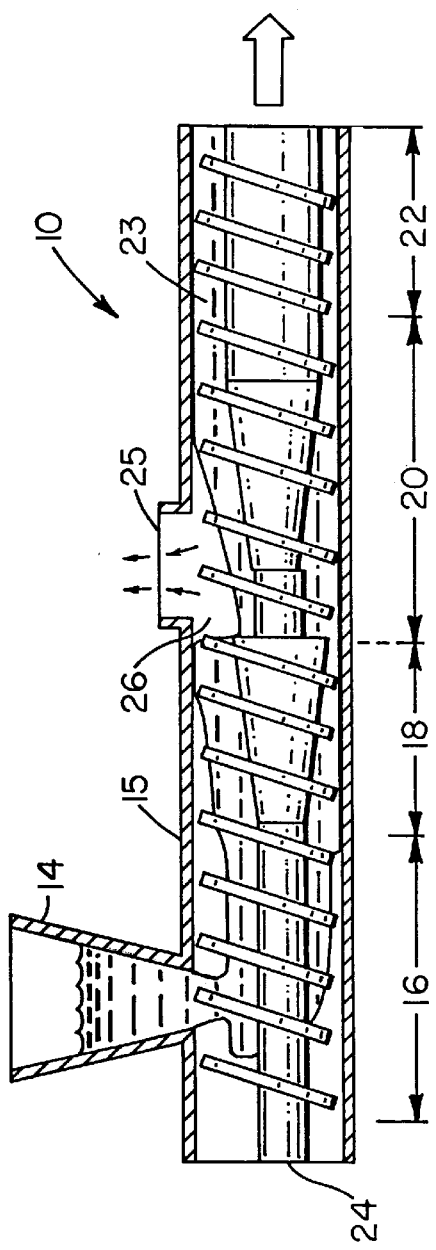
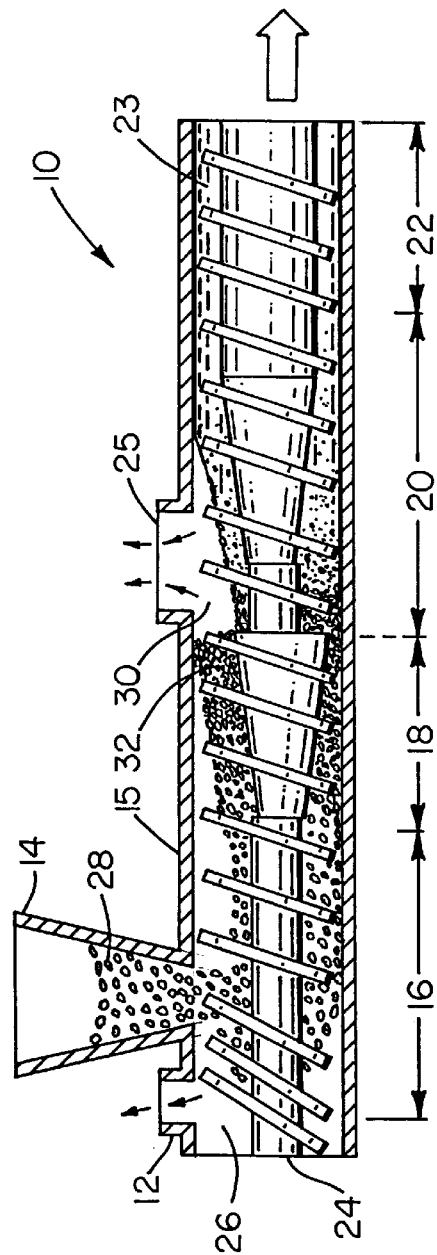
Fig. 1
PRIOR ART
Fig. 2

PROCESS FOR REMOVING MOISTURE AND VOLATILES FROM PELLETS IN SINGLE SCREW EXTRUDERS

CROSS REFERENCES TO RELATED APPLICATIONS

This application claims the benefit of U.S. Provisional Application Serial No. 60/081,163 filed Apr. 8, 1998.

TECHNICAL FIELD OF THE INVENTION

This invention relates to processes for melting polymers in single screw extruders, and more particularly to processes for removing moisture from polymer pellets fed into single screw extruders to prevent hydrolytic degradation of polymers.

BACKGROUND OF THE INVENTION

Vented extrusion is a common means for removing volatiles from a polymer during processing. Typical volatiles include, but are not limited to, oligomers, residual solvents, and moisture. Conventional vented extruders have a vent located about halfway between the feed hopper and the die (i.e. about 10 screw diameters from the hopper where the total screw length is typically 24 to 30 diameters) so that venting is performed after the polymer has melted. The vent is typically located on the surface of the barrel, i.e. a vent port, with direct exposure to the atmosphere. Another venting option is to remove the volatiles through a screw having a hollow core connecting with lateral holes in the extraction zone.

In FIG. 1, a conventional vented single screw extruder is shown. The vent is typically about ten diameters from the die end of the extruder. Polymer is fed from the hopper, through the feed section, and into the transition section. The transition section is denoted by the increasing root diameter of the screw. In the feed section, the channel is only partially filled over a short distance, and over this region, no pressure generation occurs. The actual degree of filling depends on the shape of the material fed (i.e. pellets, powders) and the method of feeding. Normally, the screw is fed from a full hopper as depicted in FIG. 1 which maximizes the degree of fill. However, the length of the partially filled section can be increased by "starve-feeding" the extruder via some type of metering device. In the transition section, the screw with its increasing diameter acts to compress the pellets and squeeze out air and free space. This action generates pressure. By the end of the first transition section, the polymer is completely melted and there is no unoccupied space in the barrel.

In order to vent the polymer to the atmosphere or create a vacuum, the melt pressure must be reduced to essentially zero. One way to accomplish this is by decompression wherein the screw root diameter is decreased so that the channel is again only partially filled. In this partially filled area, the pressure is low and venting can occur without polymer squirting out of the barrel. Volatiles can be stripped from the exposed surfaces of the polymer as the polymer transitions through the vent area into the second transition section. Once the polymer reaches the second transition section, the polymer recompresses, the channel again becomes filled, and the polymer is pumped to the metering section.

However, since venting follows melting, the polymer experiences sufficient time and high temperatures with moisture in the melt that some hydrolysis occurs before the polymer reaches the vent area. The hydrolysis results in loss of molecular weight, surface imperfections, and poor overall properties of the polymer. The conventional vented extruder systems are thus incapable of removing sufficient levels of moisture in the polymer before hydrolytic degradation occurs. In particular, the removal of moisture is important for polyesters. Since conventional venting techniques are incapable of removing moisture, polyesters often undergo a drying process prior to extrusion. Drying is often cost prohibitive because additional equipment, space, and energy is required In twin screw extrusion, multiple vents are commonly utilized including a rear vent located behind the feed hopper. Generally these rear vents are only considered effective for large-scale devolatilization when the feed material is liquid, slurry, or melt. The rear vents function similarly and are just as effective as standard vents in twin screws when the feed material is in a liquid form.

Rear venting has been used in single screw extruders, but only in cases where the feed material is already molten. Such is the case when a compounding extruder is fed into a devolatilization extruder or when the feed is a polymer-solvent solution. For many applications, the volatile involved does not degrade the polymer so early extraction is not needed. Also, the volatile is typically distributed evenly throughout the pellet, thus feeding a polymer melt versus cold pellets would result in only a minor change of devolatilization efficiency.

For polystyrene and polyolefins processes, the feed material is often made in a suspension or solution form. The solvent must be removed in order to make solid pellets that can be easily handled and shipped. Since degradation is not an issue, rapid removal of the solvent is not a concern. These resins can also contain toxic monomers, such as styrene in polystyrene or bis-A in polycarbonate, that must be removed. Usually these suspension polymers are fed in this slurry form right into the mouth of a twin screw or some other type of devolatilizer, which is why rear venting works well.

Thus, there exists a need in the art for a low capital, cost advantage method for rapid and early removal of moisture from a polymer susceptible to hydrolytic degradation to minimize hydrolysis. Accordingly, it is to the provision of such method that the present invention is primarily directed.

SUMMARY OF THE INVENTION

In a process for extruding a thermoplastic resin in a single screw extruder, a barrel of a single screw extruder has a channel, a feed section and a first melt seal located after the feed section. The process is improved by supplying solid polymer into the feed section and venting moisture extracted from the polymer during the conversion of the polymer from a solid to a melt into a vent area and through a rear vent positioned in the feed section. An unfilled area within the channel of the barrel between the rear vent and the first melt seal forms the vent area.

BRIEF DESCRIPTION OF THE DRAWINGS

FIG. 1 is a schematic of a conventional vented extruder having a vent located in the middle of the barrel.

FIG. 2 is a schematic of the rear-vented extruder of the present invention having a vent located behind the feed hopper.

DETAILED DESCRIPTION OF THE INVENTION

Moisture, other volatiles, and fines are removed from a polymer prior to the onset of hydrolysis in the method of the present invention providing an improvement over conventional single screw extrusion. Fines are small pellet chips or dust that break off of the original pellets and can cause surface/processing defects in the final product. Solid polymer, such as pellets or powder, is supplied to a feed section of a barrel of a single screw extruder. The extruder has a rear vent located in the feed section, preferably behind a feed hopper. Moisture and other volatiles within the polymer, as well as fines, are vented through the rear vent prior to the polymer moving past a first melt seal and into the remaining sections of the extruder. The rear vent removes moisture from the surface of the polymer pellets efficiently since a major fraction of the moisture is located on the pellet surface. As the pellets begin to melt, the moisture within the pellets is released and also vented through the rear vent. Thus, the method provides for rapid and early removal of the moisture from the polymer prior to becoming a melt, which minimizes degradation. Whereas, the prior art method of removing moisture occurs in conjunction with other volatiles once the polymer is converted from pellets to a melt. The moisture is trapped within the melt causing some hydrolysis and being more difficult to remove.

With reference to FIG. 2, a single screw vented extruder 10 is modified by the addition of a rear vent 12 behind a feed hopper 14, which is attached to a barrel 15. The barrel 15 of the extruder 10 has a feed section 16, a first transition section 18, a second transition section 20 and a metering section 22. A channel 23 and a screw 24 run the length of the barrel 15 through all the sections. The rear vent 12 and hopper 14 are located at the top of the barrel 15 within the feed section 16 so that gravity can help to prevent polymer from escaping through the vent. Location of the vent at the side of the barrel is also acceptable although vent flooding is more likely. A standard vent 25 is located at the top of the barrel 15 within the second transition section 20. Both rear vent 12 and standard vent 25 are positioned such that the adjacent channel 23 is only partially filled. The unfilled areas of the channel 23 define a vent area 26 for the rear vent 12 sealed by a first melt seal 32 (described below) and a vent area 30 for the standard vent 25. While utilizing the standard vent 25 and rear vent 12 together is preferred; the rear vent can be used alone.

Polymer pellets 28 feed into the extruder 10 from the feed hopper 14 into the feed section 16 and then move into the first transition section 18. During their journey, the polymer pellets 28 begin to melt. Moisture and other volatiles are released from the polymer into the vent area 26 and vented through the rear vent 12. The vent area 26 for the rear vent 12 occurs over the entire feed section 16 and into a portion of the first transition section 18 where the channel 23 is only partially filled. By the time the pellets 28 reach the end of the first transition section 18, the pellets have transformed into a melt. The melt by completely filling the channel 23 creates the first melt seal 32, which seals the vent area 26.

Since the temperature of the pellets 28 are relatively low in the feed section 16, the diffusion of moisture within the pellets will be slow making extraction of moisture from deep inside the pellets difficult. Fortunately, however, a large fraction of the moisture in a polymer is located on the surface and can be easily extracted. As the pellets 28 are conveyed from the feed section 16 toward the first transition section 18, the pellets are heated and the diffusion of moisture within the pellets increases. Thus, when the pellets are exposed to the rear vent 12, the moisture is removed before the temperature of the pellets becomes sufficiently high that hydrolysis becomes significant. In a conventional vented extruder, as shown in FIG. 1, the moisture in the pellets gets blended into the melt before reaching a standard vent 25 in the second transition section 20 thus making moisture harder to remove. This moisture causes hydrolysis in the polymer before the standard vent is reached making removal of moisture as early as possible important.

The channel 23 being filled or partially filled is important to vented extrusion. The partially filled channel defines the area over which venting may occur, i.e. the vent areas 26 and 30. A vacuum is created through the vents by the change in pressure between the vent areas and the atmosphere outside the barrel. For the vacuum to successfully strip volatiles from the surface of the polymer, an unobstructed path from the vent to the polymer is desired. Therefore, the more unfilled channel length available, the longer and more efficient the vent area. Also, in order to develop a proper vacuum within the vent area, adequate melt seals are needed on each end of the vent area. A melt seal may be created by a channel cross-section that is completely filled with polymer melt, which acts to seal off the rest of the extruder and thus contain the vacuum. In FIG. 2, the melt seal 32 in the first transition section 18 just prior to entering into the second transition section 20 illustrates such a melt seal. A poor melt seal can lead to reduced vacuum in the venting area and consequently reduced devolatilization efficiency.

In order to make the rear vent 12 function properly, a few modifications to the conventional single screw extruder may be required. First, the pitch of the screw 24 may be increased behind the hopper 14 to prevent any backfeeding of the pellets 28 due to the vacuum created by the rear vent 12. Increasing the pitch simply increases the rate at which the pellets are conveyed forward thereby offsetting the vacuum's tendency to pull the pellets backwards. Alternately, the root diameter of the screw can be increased to form a sort of "reverse transition" section (i.e. the depth of the screw decreases from the hopper to the rear vent).

Additional modifications may have to be made depending on the type of hopper or feeding system used since the hopper acts as a melt seal. Applying a vacuum to the rear vent will undoubtedly pull gases from the hopper in addition to those extracted from the pellets into the barrel of the extruder. If the hopper is open to the atmosphere, the venting may be less effective. Therefore, a lid or similar sealing device is used. Alternately, a hopper with a long throat could be used with the longer stack of pellets serving as a partial melt seal or buffer. A third alternative is to use a vacuum-type hopper, which requires a structurally rigid hopper in order to prevent vacuum collapse. A fourth alternative is to use a heated hopper and/or heated nitrogen purge to aid in stripping. Heating the pellets in the hopper slightly assists with their drying. This involves only partial, not full, drying of the pellets.

Devolatilization efficiency may also be improved by starve feeding the extruder. Starve feeding involves metering a restricted amount of polymer-less than if the hopper were normally full—into the barrel thus decreasing the amount of pellets in the partially filled channel of the feed section. To starve feed, some sort of metering device is required which can also serve as a melt seal if properly designed. The metering device must be able to feed the stream of pellets into the hopper, while at the same time sealing off atmospheric air from being pulled in by the vacuum. This may require special seals between the metering device and the regular hopper.

This invention can be further illustrated by the following examples of preferred embodiments thereof, although it will be understood that these examples are included merely for purposes of illustration and are not intended to limit the scope of the invention unless otherwise specifically indicated.

Example 1

Poly(ethylene terephthalate) pellets are loaded directly from a Gaylord container to a feed hopper of a 1.5-inch Killion single screw extruder without pre-drying. The hopper, which is open to the atmosphere, is filled with pellets. Pellet moisture level is measured on a Mark IV moisture analyzer to be 0.09 weight percent, which is higher than the 0.005 weight percent moisture level recommended for processing. The extruder is equipped with a vent port behind the feed hopper. The feed hopper is connected to a coarse vacuum pump pulling approximately 25 cubic feet per minute of air through the pellet bed. Barrel temperatures in the extruder are set from 500° to 550° F. Screw speeds are varied from 25 to 100 RPM. As the pellets are conveyed along the barrel of the extruder, moisture and other volatiles and fines are removed by the vent resulting in improved appearance in the extrudate (e.g. fewer bubbles). The vented gases are passed through a dry ice trap to capture the volatiles. After extruding about 150 lbs. of pellets, the dry ice trap is found to contain approximately 15 ml of water in addition to polyester fines.

Example 2

Pellets of poly(ethylene terephthalate) modified with 1,4-cyclohexanedimethanol are extruded using an identical process as in Example 1. Initial pellet moisture is 0.14 weight percent, which is higher than the 0.08 weight percent moisture level recommended for processing. Barrel zone temperatures are between 450° and 500° F. After extruding about 50 lbs. of pellets, the dry ice trap is found to contain approximately 22 ml of water in addition to polyester fines. Extrudate appearance also is improved.

The method of the present invention utilizing a rear vented single screw extruder for removal of moisture, other volatiles, and fines has significant advantages over the prior art. Applying vacuum to the pellets entering the extruder extracts surface moisture before the moisture has a chance to cause any hydrolysis. In a standard vented extruder, the surface moisture is already blended into the polymer before reaching the vent causing some hydrolysis degradation. The total venting area is increased by a factor of two when a rear vent is added to a standard vent, thus increasing the total moisture removed. Some evacuation of the feed hopper helps to remove air, which can lead to bubbles in the final extrudate. Bridging of the feed throat may also be minimized. Vent flooding should also be less of a problem in a single screw extruder with a rear vent since the polymer does not flow back into the feed section.

This invention has been described in detail with particular reference to preferred embodiments thereof, but it will be understood that variations and modifications can be effected within the spirit and scope of the invention.

We claim:

1. In a process for extruding a solid thermoplastic resin in a single screw extruder wherein a barrel of a single screw extruder has a channel and a screw for conveying the resin down the barrel, a feed section and a first melt seal located after the feed section, the improvement which comprises the steps of supplying a solid condensation polymer through a feeding device into the feed section and venting a vent area of moisture volatilized from the condensation polymer during the transition of the polymer from a solid to a melt through a vent positioned behind the feeding device in the feed section, wherein the vent area is defined by an unfilled area within the channel of the barrel between the rear vent and the first melt seal and wherein a portion of the screw between the rear vent and the feeding device has an increased pitch.

2. The process of claim 1 further comprising the step of purging the feeding device with a dry, inert gas.

3. The process of claim 1 further comprising the step of sealing the feeding device.

4. The process of claim 1 wherein the feeding device has a long throat.

5. The process of claim 1 wherein the step of supplying solid polymer into the feed section is by starve feeding.

6. The process of claim 1 wherein the venting of the moisture is through the rear vent located at or near the top of the barrel.

7. The process of claim 1 wherein the solid polymer is in pellet form.

8. The process of claim 1 wherein the first melt seal is formed by a cross-section of the channel being completely filled with polymer.

9. The process of claim 1 wherein the step of venting moisture, other volatiles and fines are vented.

10. The process of claim 1 further comprising the step of venting after the first melt seal.

11. The process of claim 1 wherein the thermoplastic resin is a polyester.

12. In a process for extruding a solid polyester resin in a single screw extruder, wherein the improvement comprises the steps of supplying the solid polyester pellets through a feeding device into a feed section of a barrel of a single screw extruder and venting a vent area of moisture volatilized from the polyester through a rear vent positioned behind the feeding device, wherein the vent area is defined by an unfilled area within a channel of the barrel between the rear vent and a first melt seal and wherein a portion of a screw between the rear vent and the feeding device has an increased pitch.

13. The process of claim 12 further comprising the step of purging the feeding device with a dry, inert gas.

* * * * *